Patented May 7, 1940

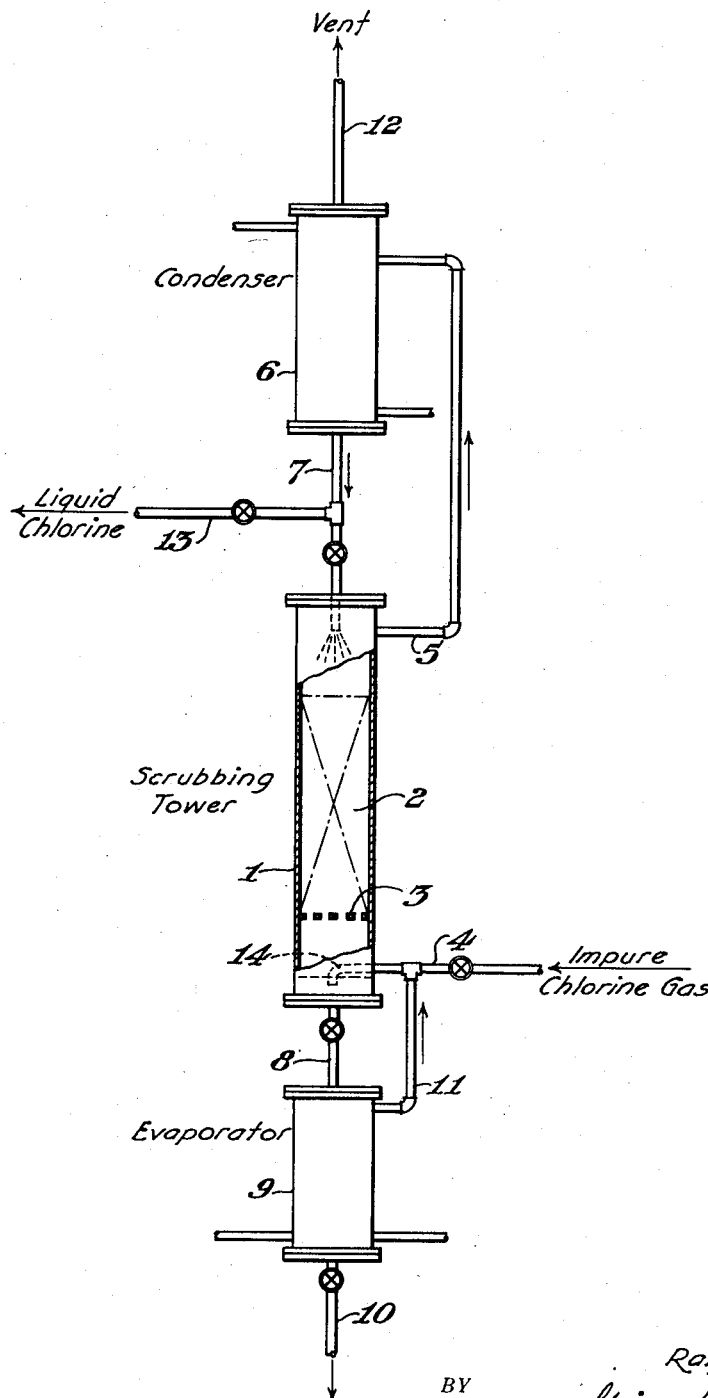

2,199,797

UNITED STATES PATENT OFFICE 2,199,797

PURIFICATION OF CHLORINE

Ralph M. Hunter, Midland, Mich., assignor to The Dow Chemical Company, Midland, Mich., a corporation of Michigan Application September 13, 1937, Serial No. 163,547

1 Claim. (Cl. 62—175.5)

The invention relates to methods of treating chlorine. It more particularly concerns a method of purifying chlorine containing relatively small amounts of organic impurities.

In the electrolytic production of chlorine in the usual types of electrolytic cells and after the chlorine delivered by the cells has been subjected to conventional purification, the chlorine still contains relatively small amounts, generally less than about 1 per cent by weight, of organic impurities. The organic impurities are formed in the electrolytic cell probably by the reaction of the chlorine on the structural materials and sealing compounds used in the cell or from organic matter which may be present in the salt solution being electrolyzed. These impurities include chloroform, carbon tetrachloride, hexachloroethane, hexachloro-benzene, and the like. Even though commercial liquid chlorine may contain as much as 99.9 per cent by weight of chlorine, considerable difficulty arises when this chlorine is allowed to vaporize and pass as a gas through valves, orifices, and pipe lines, because the organic impurities tend to remain behind therein forming clogging deposites.

One of the principal objects of the present invention is to provide a method of purifying chlorine, whereby the relatively small amounts of organic impurities normally present are removed. Other objects and advantages will become apparent as the description of the invention proceeds.

I have discovered that, by bringing the chlorine gas to be purified into contact with liquid chlorine, preferably in countercurrent relation, as by subjecting the gas to the scrubbing action of liquid chlorine in a scrubber tower, the organic impurities are substantially completely absorbed by the liquid chlorine, leaving the gas in highly purified condition. The invention, then, consists of the method hereinafter fully described and particularly pointed out in the claim, the annexed drawing and the following description setting forth a mode of carrying out the invention, such mode illustrating, however, but one of the various ways in which the principle of the invention may be used.

In said annexed drawing:

The single figure illustrates diagrammatically a preferred mode of carrying out the process. Referring to the drawing, a scrubbing tower or column 1 is shown containing suitable packing 2 for ensuring intimate contact between gaseous and liquid chlorine, the packing being supported upon a grating 3 above the bottom of the tower.

A valved gas inlet pipe 4 is provided in the base of the tower to admit the impure chlorine gas and above the packing at the top of the tower outlet pipe 5 is shown for discharging the purified chlorine gas, pipe 5 being connected to the condenser 6. A valved pure liquid chlorine line 7 is provided from the condenser 6 leading into the top of the tower. The impurities collected in the tower are drawn off through the valved discharge line 8 into the evaporator 9, which is provided with a valved drain 10 and chlorine gas discharge line 11 connected to the impure chlorine gas line 4 leading to the scrubber tower.

In the operation of the process the impure gaseous chlorine, which is preferably dry, is admitted to the tower 1 through the inlet pipe 4 at a suitable temperature and pressure, such as from 4° to 30° C., and about 1 to 3 atmospheres, respectively. At the same time pure liquid chlorine at the temperature corresponding to about the pressure prevailing in the tower is admitted through the valved inlet 7 and allowed to percolate down over the packing 2 in the tower, thereby coming in intimate contact with the ascending impure chlorine gas, removing the impurities therefrom and carrying them to the bottom of the tower as a mixture in liquid chlorine which accumulates there and is drawn off from time to time through the outlet 8 to the evaporator 9. The proportion of liquid chlorine to impure gaseous chlorine to be admitted to the tower is dependent upon the temperature of the incoming impure chlorine and the pressure conditions in the tower, as well as the concentration of impurities to be removed from the impure chlorine. It is so regulated that nearly all of it is evaporated by the incoming chlorine, leaving sufficient liquid chlorine to dissolve or suspend the impurities thus scrubbed from the incoming chlorine gas.

The scrubbed and purified chlorine gas is then led to the refrigerated condenser 6 in which the chlorine is condensed to liquid, any non-condensable gas such as air, carbon dioxide, hydrogen, etc., being separated and discharged from the condenser through vent 12. The pure liquid chlorine so condensed may be piped to storage through pipe 13, a small proportion, however, e. g. 10–25 per cent, being returned to the scrubber tower through pipe 7 for purifying the impure gas, as described.

The liquid containing impurities in solution or suspension, drawn off from the bottom of the tower, is led to the evaporator 9 and there subjected to gentle heating, as with steam or the surrounding air, to drive off chlorine from the organic impurities. The chlorine thus evaporated is returned to the scrubber tower through the pipe 11 which joins the impure chlorine gas inlet pipe 4. From time to time the residue of impurities in the evaporator is discharged through the valved drain line 10.

From the foregoing description of one mode of carrying out the invention, it will be readily appreciated that various modifications are possible and I do not wish to be limited to the exact procedure set forth. For example, the liquid chlorine containing organic impurities, which collects in the base of the tower, can be maintained under suitable temperature conditions to separate substantially the chlorine as a gas from the condensed liquid organic impurities. This can be accomplished by providing a hot water jacket around the base of the tower and providing sufficient heat to the jacket to vaporize all or a portion of the chlorine from the impurities, the impurities being then drained from the tower from time to time containing very little chlorine, while the gaseous chlorine passes upward through the packing to be scrubbed by the descending liquid chlorine and is thus recovered. By such means, the need for an evaporator separate from the tower to effect a separation of the chlorine entrained with the impurities is obviated.

In another modification, the inlet pipe 4 for impure chlorine gas may be provided with an extension 14 inside the tower 1, shown in dotted lines, such extension terminating in a downturned end which dips under the surface of the liquid collected in the base of the tower. By such means the incoming impure gas is first bubbled through the liquid in the base of the tower, which cools the gas to its equilibrium temperature at the pressure maintained within the tower. The gas then passes upwardly through the body of packing 2 in the tower, where it is scrubbed by liquid chlorine in the manner already described. By such procedure the incoming gas is used to vaporize liquid chlorine in the base of the tower, the gas being reduced in temperature to that of the liquid. Thus little vaporization of liquid chlorine then occurs in the body of packing, so that the maximum scrubbing effect of the liquid in the packing is maintained.

The following example is illustrative of the process carried out on a commercial scale using a steel tower 20 inches in diameter and 21 feet high, with 20 feet of packing composed of 1 inch Raschig rings. Dry impure chlorine gas at 20° C. containing 0.08 per cent by weight of organic impurities was introduced into the bottom of the tower at the rate of 22,200 pounds per day, together with about 10 per cent by volume of non-condensable gas consisting mostly of air, carbon dioxide, and hydrogen, while 2000 pounds per day of substantially pure liquid chlorine at −25° C., for scrubbing the impure chlorine, was introduced into the top of the tower. After a time when equilibrium was attained in the tower, its temperature was about −23° C. and the pressure therein about 2 atmospheres, under which conditions most of the liquid chlorine used for scrubbing was evaporated by the relatively warm impure gas entering the tower. A small proportion of the chlorine collected as liquid in the bottom of the tower, in admixture with the organic impurities, such liquid containing about 50 per cent of chlorine accumulating at the rate of about 40 pounds per day.

From time to time the liquid mixture of organic impurities and chlorine which collected in the bottom of the tower was discharged into the evaporator and periodically the chlorine therein was allowed to evaporate, leaving the organic impurities as a residue. The chlorine thus evaporated, which amounted to about 20 pounds per day, was more or less impure and was returned to the scrubber tower with the impure chlorine to be scrubbed. The organic impurities were collected in the evaporator at the rate of about 20 pounds per day containing very little chlorine. These impurities were periodically discharged from the evaporator to waste.

The purified gaseous chlorine product was discharged at the top of the tower into the condenser cooled to −40° C. with $CO_2$ wherein the chlorine was condensed to liquid at the rate of about 22,180 pounds per day while the uncondensed gases were vented off.

In the foregoing example the process removed approximately 96 per cent of the organic impurities present in the original chlorine, producing chlorine having a purity of about 99.997 per cent.

It has been proposed to purify chlorine gas containing a small amount of organic impurities by passing the gas through a scrubber tower provided with a refrigerated coil. Such coil condenses a portion of the gas to liquid chlorine, which drips down onto the packing in the tower, forming the scrubbing liquid. Such last-mentioned method, however, is disadvantageous in a continuously operating commercial process, since it is difficult to control the temperature of the refrigerated coil. The amount of chlorine liquefied by the refrigerated coil in the scrubber tower fluctuates greatly with variations not only in the temperature of the coil but also in rate of gas flow and in temperature, pressure and concentration of the gas. Hence, at times an insufficient amount of chlorine is liquefied in the tower to scrub out the impurities in the gas, while at other times the tower may be flooded with liquid, thus obstructing the normal flow of gas therethrough. It is not practicable to vary the refrigerating effect of the coil in accordance with all of the varying factors affecting the rate of condensation of the liquid chlorine. In practice, therefore, much more uniform operating conditions, free from stoppages and other difficulties, are maintained by introducing a regulated flow of liquid chlorine to the scrubbing tower from an external source. When the liquid chlorine is drawn from the purified product of the process, thus continuously recycling an approximately constant inventory of liquid, the most economical and easily controlled procedure is provided.

Other modes of applying the principle of my invention may be employed instead of the one explained, change being made as regards the process herein disclosed, provided the step or steps stated by any of the following claim or the equivalent of such stated step or steps be employed.

I therefore particularly point out and distinctly claim as my invention:

The process of removing the organic impurities from impure chlorine gas containing less than about 1 per cent by weight of such impurities, which comprises introducing the impure chlorine gas into the base of a scrubbing tower below the level of the impure liquid chlorine therein collected in a later step, permitting the chlorine gas to bubble through the said impure liquid chlorine and ascend in the tower against a downward flow of a relatively small amount of pure liquid chlorine produced in a later step and introduced into the upper portion of the said scrubbing tower whereby the organic impurities are absorbed by the liquid chlorine forming an impure liquid chlorine which collects in the base of the said scrubbing tower for use in the first step, withdrawing the so-treated chlorine gas from the upper portion of the scrubbing tower and impure liquid chlorine from the base thereof, liquefying the chlorine gas so withdrawn, and supplying the upper portion of the scrubbing tower with liquid chlorine from that so liquefied.

RALPH M. HUNTER.